United States Patent Office 3,445,498
Patented May 20, 1969

---

3,445,498
BORIC ACID ESTERS
Henryk A. Cyba, Evanston, Ill., assignor to Universal Oil Products Company, Des Plaines, Ill., a corporation of Delaware
No Drawing. Filed May 25, 1965, Ser. No. 458,786
Int. Cl. C07f 5/04; C10m 1/54
U.S. Cl. 260—462         4 Claims

---

ABSTRACT OF THE DISCLOSURE

Reaction product of a polyhydroxyaromatic compound, a borylating agent, and an N,N-di-hydrocarbyl hydroxyamine formed at a temperature of from about 60° to about 200° C. The compounds are useful as stabilizing additives for plastics, rubbers, hydrocarbon distillates and other organic substrates normally subject to oxidative deterioration.

---

This invention relates to a novel reaction product and to the use thereof as an additive in organic substrates.

The novel composition of matter of the present invention is the product formed by reacting a polyhydroxyaromatic compound, a borylating agent and an N,N-disubstituted hydroxyamine. As will be hereinafter set forth, the exact structure of the reaction product will vary primarily depending upon the particular configuration of the polyhydroxyaromatic compound and also on the particular borylating agent and the particular hydroxyamine used as reactants. Accordingly, the reaction product is being claimed in this manner in the present application.

In one embodiment the polyhydroxyaromatic compound contains the hydroxyl groups in proximity to each other as, for example, in catechol, and in such cases the reaction with the borylating agent will result in the formation of a cyclic borate. In the formation of the cyclic borate two valences of the boron are satisfied and this leaves one unsatisfied valence which will react with the hydroxyamine. On the other hand, when the hydroxy groups of the polyhydroxyaromatic compound are positioned further apart as, for example, in hydroquinone, one mole proportion of the borylating agent will react with each hydroxy group. The product undoubtedly will include a mixture of different compounds including monosubstituted hydroquinone, di-substituted hydroquinone and perhaps a polymer formed by the reaction of one molecule of boric acid with the hydroxyl groups of different hydroquinone molecules. When three hydroxy groups are positioned on adjacent carbon atoms as, for example, in pyrogallol, all of the above reactions may occur, depending upon the ratio of the reactants, temperature, solvent used in the reaction and the mode of addition of the reactants.

Any suitable polyhydroxyaromatic compound is used as a reactant in preparing the novel composition of matter of the present invention. In one embodiment the polyhydroxyaromatic compound is catechol and substituted catechols. The substituted catechols may contain one or more nuclear substituents which preferably are selected from alkyl of from 1 to 20 carbon atoms and which may be primary, secondary or tertiary configuration, cycloalkyl of from 3 to 10 carbon atoms, alkoxy of from 1 to 12 carbon atoms or halogen. A particularly preferred substituted catechol is tertiarybutyl catechol. Other polyhydroxyaromatic compounds containing the hydroxyl groups in adjacent positions include 1,2-dihydroxynaphthalene, 1,2-dihydroxyanthracene, 1,2-dihydroxyanthroquinone, 1,2-dihydroxydiphenyl, saligenin, etc., as well as these compounds containing one or more nuclear substitutions, the substitutions preferably being selected from those hereinbefore set forth. Other dihydroxyaromatic compounds containing the hydroxyl groups in adjacent positions include 2,3-dihydroxybenzophenone, 2,3-dihydroxyacetophenone, 2,3-dihydroxypropiophenone, 2,3-dihydroxybutyrophenone, 2,3-dihydroxyvalerophenone, 2,3-dihydroxycaprylophenone, 2,3 - dihydroxylaurylphenone, 2,3-dihydroxypalmitylphenone, etc., as well as the corresponding 3,4-, 4,5- or 5,6-dihydroxy compounds, 1',2',3', 4',5',6'-hexahydro-2,3-dihydroxybenzophenone, and these compounds containing one or more substitutions preferably selected from those hereinbefore set forth. Also included in dihydroxy-substituted compounds in which the hydroxyl groups are in sufficiently close proximity to result in chelate formation are 2,2'-dihydroxybenzophenone and the nuclear substituted derivative thereof.

Still other suitable polyhydroxy compounds are polyhydroxydiphenyl alkanes, ethers, sulfides and amines. Of the polyhydroxydiphenyl alkanes, the methanes, ethanes, propanes and butanes are preferred, although the alkane group may contain up to 12 or more carbon atoms. Illustrative reactants in this example include 2,2'-dihydroxydiphenyl methane, 2,3,2',3'-tetrahydroxydiphenyl methane, 3,3'-dihydroxydiphenyl methane, 4,4'-dihydroxydiphenyl methane, 3,4,3',4'-tetrahydroxydiphenyl methane, and these compounds containing substituents, the substituents preferably being selected from those hereinbefore set forth, similar polyhydroxydiphenyl ethanes, polyhydroxydiphenyl propanes, polyhydroxydiphenyl butanes, polyhydroxydiphenyl pentanes, polyhydroxydiphenyl hexanes, etc. Illustrative polyhydroxydiphenyl ethers include 2,2'-dihydroxydiphenyl ether, 2,3,2',3'-tetrahydroxydiphenyl ether, 4,4'-dihydroxydiphenyl ether, etc., and substituted derivatives thereof. Illustrative polyhydroxydiphenyl sulfides include 2,2'-dihydroxydiphenyl sulfide, 2,3,2',3'-tetrahydroxydiphenyl sulfide, 4,4'-dihydroxydiphenyl sulfide, etc., and substituted derivatives thereof. Illustrative polyhydroxydiphenyl amines include 2,2'-dihydroxydiphenyl amine, 2,3,2',3'-tetrahydroxydiphenyl amine, 4,4'-dihydroxydiphenyl amine, etc., and substituted derivatives thereof.

Still another type of polyhydroxy compound includes the polyhydroxyspirochromans. Illustrative polyhydroxyspirochromans include 6,7-dihydroxy-bis-2,2'-spirochroman and 6,7,6',7'-tetrahydroxy-bis-2,2'-spirochroman, and their substituted derivatives, the substitutions preferably being selected from those hereinbefore set forth. Specific examples of such substituted polyhydroxyspirochromans include 6,6',7,7' - tetrahydroxy - 4,4,4',4' - tetramethyl-bis-2,2'-spirochroman, 6,6',7,7'-tetrahydroxy-4,4'-diethyl-bis-2,2'-spirochroman, 6,6',7,7'-tetrahydroxy - 4,4' - dimethyl-4,4'-di-n-hexyl-3-n-amyl-bis-2,2'-spirochroman etc.

As hereinbefore set forth, pyrogallol and substituted pyrogallols contain the hydroxyl groups in adjacent positions so that two of the hydroxyl groups may react with the borylating agent to form a cyclic structure. Other polyhydroxyaromatic compounds containing three hydroxyl groups include hydroxyhydroquinone, phloroglucinol, etc. In another embodiment, the hydroxyl groups are not on adjacent carbon atoms as, for example, in resorcinol, hydroquinone, 1,3,5-trihydroxybenzene, etc., and their substituted derivatives.

From the above discussion it will be seen that any suitable polyhydroxyaromatic compound may be used as a reactant in preparing the novel composition of the present invention. When the hydroxyl groups are positioned on adjacent carbon atoms or are in close proximity, a cyclic configuration occurs. When the hydroxyl groups are positioned further apart from each other, a cyclic structure is not obtained. It is understood that the different polyhydroxyaromatic compounds will not necessarily react identically but all of them will react to form desired compositions of matter.

The novel reaction product includes the reaction with a borylating agent. Any suitable borylating agent may be used. A particularly preferred borylating agent is boric acid. Other borylating agents include trialkyl borates in which the alkyl groups preferably contain from 1 to 4 carbon atoms each. In the use of the latter type borylating agent, the reaction is effected by transesterification and, accordingly, there is no advantage to using trialkyl borates containing more than 4 carbon atoms in each alkyl group, although the higher boiling trialkyl borates may be used when satisfactory and advantages appear therefor. Still other borylating agents include boric anhydride, boric oxide, boric acid complex, alkyl boric acid, dialkyl boric acid, cycloalkyl boric acid, dicycloalkyl boric acid, aryl boric acid, diaryl boric acid, alkylboronic acid, arylboronic acid, or substitution products of these with alkoxy, alkyl and/or halo groups.

The other reactant for use in preparing the novel reaction product of the present invention is an N,N-di-substituted hydroxyamine. In one embodiment this is an N,N-di-substituted alkanolamine. In a preferred embodiment the alkanol moiety contains from 2 to 6 carbon atoms, although it may contain up to 12 or more carbon atoms when desired. The substitutions on the nitrogen atom preferably are hydrocarbyl and thus are selected from alkyl, cycloalkyl and aryl. The alkyl substituents may contain from 1 to about 20 and preferably from 3 to 15 carbon atoms each. Illustrative N,N-dialkyl-ethanolamines include N,N-diisopropylethanolamine, N,N-di-secbutyl - ethanolamine, N,N-di-secpentyl-ethanolamine, N,N-di-sechexyl-ethanolamine, N,N-di-secheptyl-ethanolamine, N,N-di-secoctyl-ethanolamine, N,N - di - secnonyl-ethanolamine, N,N - di - secdecyl - ethanolamine, N,N-di-secundecyl-ethanolamine, N,N - di - secdodecyl - ethanolamine, N,N-di-sectridecyl-ethanolamine, N,N-di-sectetradecylethanolamine, N,N-di-secpentadecyl - ethanolamine, etc. A preferred N,N-dicycloalkyl-ethanolamine is N,N-dicyclohexyl-ethanolamine. Other N,N-dicycloalkyl-ethanolamines include N,N-dicyclobutyl-ethanolamine, N,N-dicyclopentyl-ethanolamine, N,N-dicycloheptyl-ethanolamine, N,N-dicyclooctyl-ethanolamine, N,N-dicyclononyl-ethanolamine, N,N-dicyclodecyl-ethanolamine, etc. Illustrative N,N-diaryl-ethanolamines include N,N-diphenyl-ethanolamine, N,N - ditolyl - ethanolamine, N,N-dixylyl-ethanolamine, etc. The above examples are of di-substituted ethanolamines, it being understood that the corresponding propanolamines, butanolamines, pentanolamines, hexanolamines, etc., may be used when desired.

In another embodiment the N,N-di-substituted hydroxyamine is a hydroxyaromatic amine. Illustrative compounds in this embodiment include N,N-dialkyl-hydroxyaniline, N,N-dicycloalkyl-hydroxyaniline, N,N-diphenyl-hydroxyaniline and the nuclear substituted derivatives thereof. It is understood that the substitutions on the nitrogen atom will be selected from those hereinbefore set forth. In a preferred embodiment the nitrogen atom and hydroxyl group are in para- position to each other but these may be in the ortho- or meta-positions to each other. In another embodiment the N,N-di-substituted hydroxyamine is an N,N-di-substituted hydroxycyclohexyl amine in which the hydroxy and amino groups are in position ortho-, meta- or para- to each other and in which the substitutions on the nitrogen atom are selected from those hereinbefore set forth.

The reaction of the polyhydroxyaromatic compound, borylating agent and N,N-di-substituted hydroxyamine is effected in any suitable manner. In one method the reactants in the desired proportions are mixed and the mixture is heated and refluxed to effect the desired reaction. In another method the polyhydroxyaromatic compound and borylating agent are first reacted and then the N,N-di-substituted hydroxyamine is reacted with the partial reaction products. In still another embodiment the borylating agent and N,N-di-substituted hydroxyamine are first reacted and then the partially reacted products are further reacted with the polyhydroxyaromatic compound.

Regardless of the particular method of reacting, the reaction is effected by heating and refluxing the mixture of reactants. In one embodiment the reaction is effected at a temperature within the range of from about 60° to about 100° C. when using boric acid. When chelate formation does not occur, the reaction may be effected at a temperature above about 100° C. and thus within the range of from about 100° to about 200° C. or more, in which reaction meta-borates are formed. Also, the higher temperature of from about 100° to about 200° C. is used when employing trialkyl borates in order to effect the transesterification reaction.

In one method the reactants are refluxed in the presence of a solvent. Any suitable solvent may be used and advantageously comprises an aromatic hydrocarbon solvent including benzene, toluene, xylene, ethylbenzene, cumene, etc. Other solvents include n-hexane, n-heptane, n-octane, chlorinated hydrocarbons, etc., or mixtures thereof. The use of a solvent is particularly preferred when boric acid is used as the borylating agent. When using a trialkyl borate as the borylating agent, the solvent may be omitted. While no catalyst normally is required, a catalyst may be used when employing the trialkyl borate. Any suitable catalyst may be employed including sodium hydrogen sulfate, potassium hydrogen sulfate, tin oxide, polyalkyl tin derivatives, alkoxy titanium derivatives, trialkyl or trialkoxy aluminum, toluene sulfonic acid, benzene sulfonic acid, various sulfonated ion exchange resins, solid phosphoric acid, polyphosphroic acid, sulfuric acid and in fact any suitable esterification or transesterification catalyst.

The temperature of the refluxing will depend upon the particular solvent employed. For example, with benzene as the solvent, the temperature will be of the order of 80° C. When using toluene, the temperature will be of the order of 110° C. When using xylene, the temperature will be of the order of 140° C.

The proportions of borylating agent, polyhydroxyaromatic compound and N,N-di-substituted hydroxyamine will vary depending upon the particular reactants employed. In general the proportion of borylating agent to polyhydroxyaromatic compound will be within a mole raito of 0.5 to 4 and preferably from about 1 to about 3 mole proportions of borylating agent per one mole proportion of polyhydroxyaromatic compound. The N,N-di-substituted hydroxyamine generally will be used in equal mole proportions to the borylating agent but may vary from 0.5 to 3 mole proportions of the hydroxyamine per one mole proportion of borylating agent.

As hereinbefore set forth the reaction is readily effected by heating and refluxing the reactants, with or without solvent and/or catalyst as required. Refluxing is continued until the required amount of water when using boric acid or of alcohol when using trialkyl borate is collected. Following completion of the reaction the solvent and alcohol, if any, are removed by vacuum distillation. The reaction product generally is recovered as a solid and may be used as such or when desired the reaction product may be retained in the solvent and used as such or the reaction product may be prepared as a solution in a different solvent and used in this manner.

From the above discussion it will be seen that the exact structure of the reaction product may vary and also that the reaction product may consist of a mixture of compounds. It is understood that the different reaction products meeting the requirements as hereinbefore set forth may be used for the purposes of the present invention but that the different additives are not necessarily equivalent in their effectiveness in the same or different substrates.

The novel compounds of the present invention possess varied utility. They are particularly advantageous for use as additives in organic substances subject to oxidative deterioration. These compounds also serve as weathering stabilizers to protect substrates which undergo ultraviolet light-induced oxidation. Also, they may serve as anti-mildew, fungicide, bactericide, etc., additives for organic substrates, especially fibers, cloth, paint, varnish, other coatings, fuels, etc., or as antistatic or antiblocking additives and as dye sites in plastics. The substrates normally subject to exposure to weather include plastics, resins, paints, varnishes, other coatings, fibers, textiles, etc.

Illustrative plastics which are stabilized by the novel compounds of the present invention include polyolefins and particularly polyethylene, polypropylene, polybutylene, mixed ethylene propylene polymers, mixed ethylene butylene polymers, mixed propylene butylene polymers, including the above copolymerized with straight chain or cyclic diene to give terpolymers which can be cured to rubbers, etc. The solid olefin polymers are used in many applications including electrical insulation, lightweight outdoor furniture, awnings, cover for greenhouses, fibers, etc. In many of these applications the solid olefin polymer is exposed to sunlight and air.

Another plastic being used commercially on a large scale is polystyrene. The polystyrene type resins are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), saran (copolymer of vinylidine chloride and vinyl chloride), rayon, etc. Here again, deterioration occurs due to ultraviolet light and oxidation. In addition, the additives of the present invention may serve as dye sites in plastics. This is especially desirable in plastics used for textiles as, for example, use of plastics for carpeting, fabrics, etc. Furthermore, the additives of the present invention also may inhibit discoloration of the plastic.

Still other plastics are prepared from other monomers and are available commercially. Illustrative examples include polyurethanes, both the urethane foams and the rigid resins, epoxy resins, polycarbonates, etc. Still other illustrative examples include phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various plastics and resins which are improved by the additives of the present invention. As hereinbefore set forth, still other substrates include paints, varnishes, drying oils, pigments, rust preventive coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, resins, paints, etc., which normally are not exposed outdoors.

The compounds of the present invention also are of utility as additives in other organic substrates including, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the compounds of the present invention serve to inhibit oxidative deterioration, thermal deterioration, etc., thereby retarding and/or preventing sediment formation, preventing and/or retarding discoloration, rust or corrosion inhibitor, detergent, dispersing agent, etc. In gasoline, the additive improves the combustion characteristics of the gasoline.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6-ditertiarybutyl-4-methylphenol. Other inhibitors which may be used generally will be of the phenolic or amine type and include phenyl-alpha-naphthylamine, phenyl-beta-naphthylamine, phenothiazine, Nonox WSP, Nonox Cl, dialkylated phenols, trialkylated phenols including 2,4-di-methyl-6-tertiarybutylphenol, etc., Santonox R, Santowhite, alkyl-alkoxyphenols, 2246 (2,2' - methylene-bis - (4-methyl-6-tert-butylphenol) and 425 (2,2'-methylene-bis-(4-ethyl-6-tert-butylphenol), diphenyl-p-phenylene - diamine, 1,1,3-tris - (2-methyl - 4-hydroxy-5-t-butylphenyl)-butane, 703 (2,6-di-tert - butyl-alpha - dimethylamino-p-cresol), 4,4'-bis-(2-methyl - 6-tert-butylphenol); 4,4'-thio-bis-(6-tert-butyl-o-cresol); 4,4'-bis - (2,6-di-tert-butylphenol); 4,4'-methylene-bis - (2,6-di-tert-butylphenol); Salol (salicylic acid esters), p-octyl-phenylsalicylate, various phosgene alkylated phenol reaction products, etc. Other ultraviolet light stabilizers include nickel-bis-dithiocarbamates and especially nickel-bis-dibutyldithiocarbamate, nickel-bis-dihydroxypolyalkylphenol sulfides, especially [2,2'-thiobis-(4-t-octylphenolato)]-n-butylamine nickel (II), dilauryl beta-mercaptodipropionate, dihydroxy-tetralkyl sulfides, dihydroxytetralkyl methanes, various trithiophosphites as trilaurylthiophosphite, dialkylphosphites, trialkylphosppites, high molecular weight nitriles, various Mannich bases, various N-hydroxyphenylbenzotriazoles such as 2-(2'-hydroxy-5'-octylphenyl)-benzotriazole, 2-(2'-hydroxy-5'-dodecylphenyl)-benzotriazole, 2-(2'-hydroxy-5'-octoxyphenyl)-benzotriazole, 2-(2'-hydroxy-5' - dodecoxyphenyl)-benzotriazole, Tinuvin 326, etc., in general, any alkyl or alkoxyphenyl substituted benzotriazole, etc. The additional inhibitor may be used in a concentration of from about 1% to about 200% by weight and generally from about 10% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to about 25% but generally will be used in a concentration of from about 0.01% to about 5% by weight of the substarte. When used in hydrocarbon distillate and particularly gasoline, the additive generally is used in a concentration of from about 0.0001% to about 0.5%. The additive is incorporated in the substrate in any suitable manner. For example, when it is incorporated into a plastic, resin or the like, it may be added to the hot melt with stirring, generally in a Banbury mixer, extruder or other device. When it is added to a liquid, it is incorporated into the liquid with intimate stirring. When it is added to a multicomponent mixture as, for example, grease, it may be added to one of the components and, in this manner, incorporated into the final mix or it may be added directly into the final mix.

The additive of the present invention may be utilized as such or prepared as a solution in a suitable solvent including alcohols and particularly methanol, ethanol, propanol, butanol, etc., hydrocarbons and particularly benzene, toluene, xylene, cumene, decalin, etc.

The following examples are introduced to illustrate further the novelty and utility of the present invention but not with the intention of unduly limiting the same.

Example I

The compound of this example was prepared by the reaction of equal mole proportions of 4-tertiarybutyl catechol, boric acid and N,N-dicyclohexyl-ethanolamine. The reaction was effected by commingling 33.2 g. (0.2 mole) of 4-tertiarybutyl catechol, 45 g. (0.2 mole) of N,N-dicyclohexyl-ethanolamine, 12.36 g. (0.2 mole) of boric acid and 100 g. of benzene solvent. The mixture was heated and refluxed at a temperature starting at 76° C. After heating and refluxing for six hours, a total of 9.2 ml. of water was collected. In order to insure completion of the reaction, 50 ml. of toluene were added and the refluxing continued at a higher temperature, during which time 50 ml. of the benzene added originally had been removed overhead. Following completion of the reaction 90 g. of product were collected. In order to remove any impurities or unreacted amine, the product precipitated and 70 grams were collected. Analysis showed a boron content of 2.53% by weight which corresponds to a theoretical boron content of 2.72% by weight for the following reaction product:

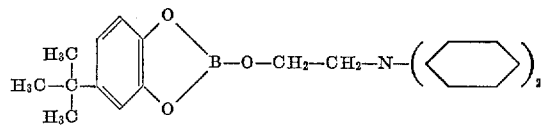

While applicant believes the reaction product to be of the structure set forth above, it is understood that applicant does not wish to be limited to this specific compound. However, the reaction of all of the boron is confirmed by the fact that the impurities or unreacted amine which dissolved in the hexane fraction mentioned above was submitted for boron analysis and was found to contain no boron.

Example II

The compound of this example is prepared in substantially the same manner as described in Example I except that the N,N-di-substituted hydroxyamine used in this preparation is N,N-di-secbutyl-ethanolamine. Equal mole proportions of 4-tertiarybutyl catechol, boric acid and N,N-di-secbutyl-ethanolamine are heated and refluxed for a period of 8 hours in benzene solvent, during which time the water liberated in the reaction is recovered. Following completion of the reaction, the reaction product is separated from the solvent and is recovered.

Example III

The reaction product of this example is prepared by heating and refluxing one mole proportion of hydroquinone, two mole proportions of boris acid and four mole proportions of N,N-diisopropyl-propanolamine in the presence of toluene solvent. The heating and refluxing is continued at a temperature of about 100° C., during which time the water formed in the reaction is distilled overhead and collected. Upon completion of the reaction, the reaction mixture is allowed to cool and the product is recovered in admixture in the solvent.

Because the hydroxy groups are in a position distant from each other, formation of a cyclic product does not occur. It is believed that the reaction product will include the following configuration:

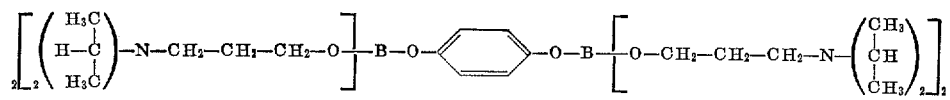

It will be noted that one valence of each of the boron is satisfied by one hydroxyl group of the hydroquinone and that the other two valences of the boron are satisfied by two molecules of the propanolamine.

Example IV

The reaction product of this example is prepared by first reacting saligenin with boric acid and then reacting with N,N-dicyclohexyl-p-hydroxyaniline. The reaction is effected in the presence of toluene solvent by first heating and refluxing equal mole proportions of saligenin and boric acid for a period of 4 hours and then adding an equal mole proportion of N,N-dicyclohexyl-p-hydroxyaniline and continuing the heating and refluxing for another 4 hours. Following completion of the reaction, the reaction mixture is allowed to cool and the product is recovered in admixture with the toluene solvent and used in this manner as an additive to hydrocarbon distillate.

Example V

The reaction product of this example is prepared by refluxing 2,4-dihydroxybenzophenone, boric acid and N,N-di-secoctyl-ethanolamine. The reaction is effected by heating and refluxing one mole proportion of 2,4-dihydroxybenzophenone, one mole proportion of boric acid and two mole proportions of N,N-di-secoctyl-ethanolamine. The refluxing is effected in the presence of benzene solvent and is continued for a period of 8 hours, during which time the water formed in the reaction is liberated and recovered. Following completion of the reaction, the reaction mixture is distilled under vacuum to remove the benzene solvent and to recover the desired product. Because two mole proportions of the hydroxyamine are used, it is believed that one valence of the boron is satisfied by one hydroxyl group of the benzophenone and that the other two valences of the boron are satisfied by two molecules of the ethanolamine.

Example VI

The reaction product of this example is prepared by the transesterification reaction in which tributyl borate is used as the borylating agent. The reaction is effected by heating and refluxing equal mole proportions of pyrogallol, tributyl borate and N,N-diphenyl-ethanolamine in xylene solvent. The refluxing is effected at a temperature of about 140° C. and is continued until the required amount of butanol is collected, the butanol resulting from the transesterification reaction. Following completion of the reaction, the reaction mixture is worked up in substantially the same manner as hereinbefore set forth and the product is recovered in solution in the xylene solvent used in the reaction.

Example VII

As hereinbefore set forth the compound of the present invention is useful as an antioxidant in plastic. The plastic of this example is solid polypropylene. The solid polypropylene without inhibitor is stated to have properties substantially as follows:

TABLE 1

| | |
|---|---|
| Specific gravity | 0.910–0.920 |
| Refractive index, $n_D^{25}$ | 1.510 |
| Heat distortion temperature, at— | |
| 66 p.s.i. load ° C | 116 |
| 264 p.s.i. load ° C | 66 |
| Tensile yield strength, p.s.i. (ASTM D–638–58T) (0.2″ per min.) | 4700 |
| Total elongation, percent | 300–400 |
| Stiffness flexural (ASTM D747–50) $10^5$ p.s.i. | 1.8 |
| Shore hardness (ASTM D676–55T) | 74D |

The additive when employed was incorporated in the sample of the polypropylene by milling. The sample of the polypropylene was evaluated in a method similar to that described by Hawkins, Hansen, Matreyek and Winslow in Rubber Chemistry and Technology, October–November, 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential pressure is periodically determined. The induction period is taken as the number of hours required to reach a pressure differential of 20 cm. Hg.

When evaluated in the above manner, a control sample of the polypropylene without additive had an induction period of less than 4¼ hours. Another sample of the polypropylene containing 1% by weight of the reaction product of 4-tertbutyl catechol, boric acid and N,N-di-cyclohexyl-ethanolamine, prepared as described in Example I, and 0.15% by weight of 2,6-ditertbutyl-4-methylphenol was evaluated in the same manner and the induction period was increased to 1100 hours. It is believed that the use of the reaction product in admixture with the 2,6-ditertbutyl-4-methylphenol results in a synergistic effect and increases the induction period even more than obtained when using the reaction product alone. The 2,6-ditertbutyl-4-methylphenol, when used alone and evaluated in the above manner, was of substantially no effect in increasing the induction period of the polypropylene.

Example VIII

The plastic of this example is solid polyethylene of the high density type. An inhibited product of this polyethylene is marketed commercially under the trade name of "Fortiflex." Samples of the polyethylene are pressed into plaques and evaluated in the Fadeometer. The plaques are inserted into plastic holders affixed onto a rotating drum and exposed to carbon arc rays at about 52° C. in the Fadeometer. The samples are examined periodically by infrared analysis to determine the carbonyl band at 1715 cm.$^{-1}$, which is reported as the "carbonyl number." The higher intensity of the carbonyl band indicates a higher carbonyl concentration (expressed as carbonyl number) and, accordingly, increased deterioration.

The additive of this example is the reaction product of hydroquinone, boric acid and N,N-diisopropylpropanolamine, prepared as described in Example III, and is incorporated in a concentration of 1% by weight in otherwise uninhibited samples of the polyethylene prior to pressing into sheets. This serves to stabilize the polyethylene and to considerably increase the time before a carbonyl number of 1000 is reached.

Example IX

The plastic of this example is polystyrene. During milling thereof 1% by weight of the reaction product of 4-tertbutyl catechol, boric acid and N,N-di-secbutyl-ethanolamine, prepared as described in Example II, is incorporated in the polystyrene. This serves to inhibit deterioration of the polystyrene upon exposure to weathering.

Example X

The reaction product of saligenin, boric acid and N,N-dicyclohexyl-p-hydroxyaniline, prepared as described in Example IV except that the toluene solvent is removed from the reaction product by vacuum distillation, is utilized as an inhibitor in polyvinyl chloride plastic. The additive is incorporated by partly melting the polyvinyl chloride plastic and adding the inhibitor into the hot melt in a concentration of 0.75% by weight. This serves to inhibit deterioration of the polyvinyl chloride plastic upon exposure to oxygen and light.

Example XI

The reaction product of 4-tertbutyl catechol, boric acid and N,N-dicyclohexyl-ethanolamine, prepared as described in Example I, was incorporated in another sample of the polypropylene described in Example VII by milling therein in conventional manner and pressing into sheets. The sheets then were cut into dumb-bell specimens and were exposed to weathering on an outerdoor rack facing south and inclined at a 45° angle at Des Plaines, Ill.

Dumb-bell specimens of the polypropylene without additives and dumb-bell specimens containing 1% by weight of the reaction product described above and 0.15% by weight of 2,6-ditertbutyl-4-methylphenol were evaluated outdoors in the manner described above. Periodically the physical properties of the samples were determined in an Instrom Universal tester. In this evaluation the dumb-bell specimen is gripped firmly at the top and bottom in a machine in which a constant pull of 2″ per minute is exerted downwardly. The following table reports the results of the yield point (also called yield strength), which is the maximum point at which the sample first shows loss of physical strength and is reported in pounds per square inch of load at that point. All of these samples were placed outdoors in the month of March.

TABLE II

| | Yield strength, lbs./sq. in. | | | | | |
|---|---|---|---|---|---|---|
| | Days | | | | | |
| Additive | 0 | 18 | 24 | 29 | 58 | 92 |
| None | 4,304 | 4,203 | 4,225 | 2,604 | (Brittle) | |
| 1% by weight of reaction product of Example I +0.15% by weight of 2,6-ditertbutyl-4-methylphenol | 4,518 | | | | 4,807 | 4,862 |

From the data in the above table it will be seen that the control sample (without additives) dropped in yield point from 4304 to 2604 within 29 days. The sample was brittle and lost its desirable physical properties. In contrast, the sample containing the additive still retained a yield point of over 4800 pounds per square inch after 92 days of outdoor exposure, thus showing the effectiveness of the additive of the present invention to stabilize the polypropylene against weathering.

Example XII

This example describes the use of the additive of the present invention in grease. In this example the reaction product of pyrogallol, trimethyl borate and N,N-diphenylethanolamine, prepared as described in Example VI, is incorporated in a concentration of 0.3% by weight in a commercial Mid-Continent lubricating oil having an S.A.E. viscosity of 20. Approximately 92% of the lubricating oil then is mixed with approximately 8% by weight of lithium stearate. The mixture is heated to about 230° C., with constant agitation. Subsequently the grease is cooled, while agitating, to approximately 120° C., and then the grease is further cooled slowly to room temperature.

The stability of the grease is tested in accordance with ASTM D–942 method, in which method a sample of the grease is placed in a bomb and maintained at a temperature of 121° C. Oxygen is charged to the bomb, and the time required for a drop of five pounds pressure is taken as the induction period. A sample of the grease without additive will reach the induction period within 4 hours. A sample of the grease containing 0.5% by weight of the reaction product of the present invention will not reach the induction period until more than 100 hours when evaluated in the above manner.

Example XIII

This example describes the use of the additive of the present invention in synthetic lubricating oil. The synthetic lubricating oil is dioctyl sebacate and is marketed commercially under the trade name of "Plexol." The additive is the reaction product of 4-tertbutyl catechol, boric acid and N,N-dicyclohexyl-ethanolamine, prepared as described in Example I, and is incorporated in a concentration of 1% by weight in the synthetic lubricating oil with intimate mixing. This serves to prevent oxidative deterioration of the lubricating oil.

I claim as my invention:

1. The product formed by heating and refluxing 4-tertbutyl catechol, boric acid and N,N-dicyclohexyl-ethanolamine in the presence of benzene solvent, cooling the reaction mixture, removing the benzene solvent and recovering the reaction product as a solid.

2. The product formed by reacting a catechol, boric acid and an N,N-di-hydrocarbyl-alkanolamine in which the alkanol moiety contains from 2 to about 12 carbon atoms and each hydrocarbyl substituent is selected from the group consisting of alkyl having up to about 20 carbon atoms, cycloalkyl having from 4 to about 10 carbon atoms, phenyl and lower alkyl-substituted phenyl, at a temperature of from about 60° to about 200° C., in the presence of an aromatic hydrocarbon solvent.

3. The product formed by reacting a hydroquinone, boric acid and an N,N-di-hydrocarbyl-alkanolamine in which the alkanol moiety contains from 2 to about 12 carbon atoms and each hydrocarbyl substituent is selected from the group consisting of alkyl having up to about 20 carbon atoms, cycloalkyl having from 4 to about 10 carbon atoms, phenyl and lower-alkyl-substituted phenyl, at a temperature of from about 60° to about 200° C., in the presence of an aromatic hydrocarbon solvent.

4. The product formed by reacting a resorcinol, boric acid and an N,N-di-hydrocarbyl-alkanolamine in which the alkanol moiety contains from 2 to about 12 carbon atoms and each hydrocarbyl substituent is selected from the group consisting of alkyl having up to about 20 carbon atoms, cycloalkyl having from 4 to about 10 carbon atoms, phenyl and lower alkyl-substituted phenyl, at a temperature of from about 60° to about 200° C., in the presence of an aromatic hydrocarbon solvent.

References Cited

UNITED STATES PATENTS

| 2,587,753 | 3/1952 | O'Connor et al. | 260—462 X |
| 2,795,548 | 6/1957 | Thomas et al. | 260—462 X |
| 3,257,442 | 6/1966 | Woods et al. | 260—462 |

BERNARD HELFIN, *Primary Examiner.*

L. DE CRESCENTE, *Assistant Examiner.*

U.S. Cl. X.R.

44—75; 106—14; 252—49.6, 152, 392, 403; 260—45.8, 45.9, 999